United States Patent [19]

Jack

[11] Patent Number: 5,270,681
[45] Date of Patent: Dec. 14, 1993

[54] BICYCLE AND BICYCLE ELEMENTS THEFT ALARM APPARATUS

[76] Inventor: Lynn E. Jack, Rte. 1, Box 7A, Palmer Lake, Colo. 80133

[21] Appl. No.: 780,012

[22] Filed: Oct. 21, 1991

[51] Int. Cl.⁵ .............................................. B60R 25/10
[52] U.S. Cl. .................................... 340/427; 340/432; 340/568
[58] Field of Search ............... 340/432, 426, 427, 429, 340/568

[56] References Cited

U.S. PATENT DOCUMENTS 4,211,995 7/1980 Smith .................................. 340/426
4,887,064 12/1989 Drori .................................. 340/426

Primary Examiner—John K. Peng
Assistant Examiner—Christine K. Oda
Attorney, Agent, or Firm—Phillip A. Rein

[57] ABSTRACT

A bicycle and bicycle elements theft alarm apparatus which can be attached to a bicycle assembly to activate an alarm member on unauthorized movement, theft of elements of the object, and entire theft of the object. The bicycle theft alarm apparatus includes a housing assembly having an alarm assembly and a control circuit assembly mounted therein. The alarm assembly includes 1) an actuator key pad assembly operable with a secret code for operation thereof; 2) a wheel release actuator member to indicate unauthorized removal of a bicycle support wheel assembly; 3) a seat release actuator member to indicate unauthorized removal of a bicycle support seat assembly; 4) a cable motion detector assembly operable to detect unauthorized detachment from an immovable object used as an anchor member; and 5) a motion detector assembly operable to detect unauthorized vertical or lateral movement of the bicycle assembly.

11 Claims, 2 Drawing Sheets

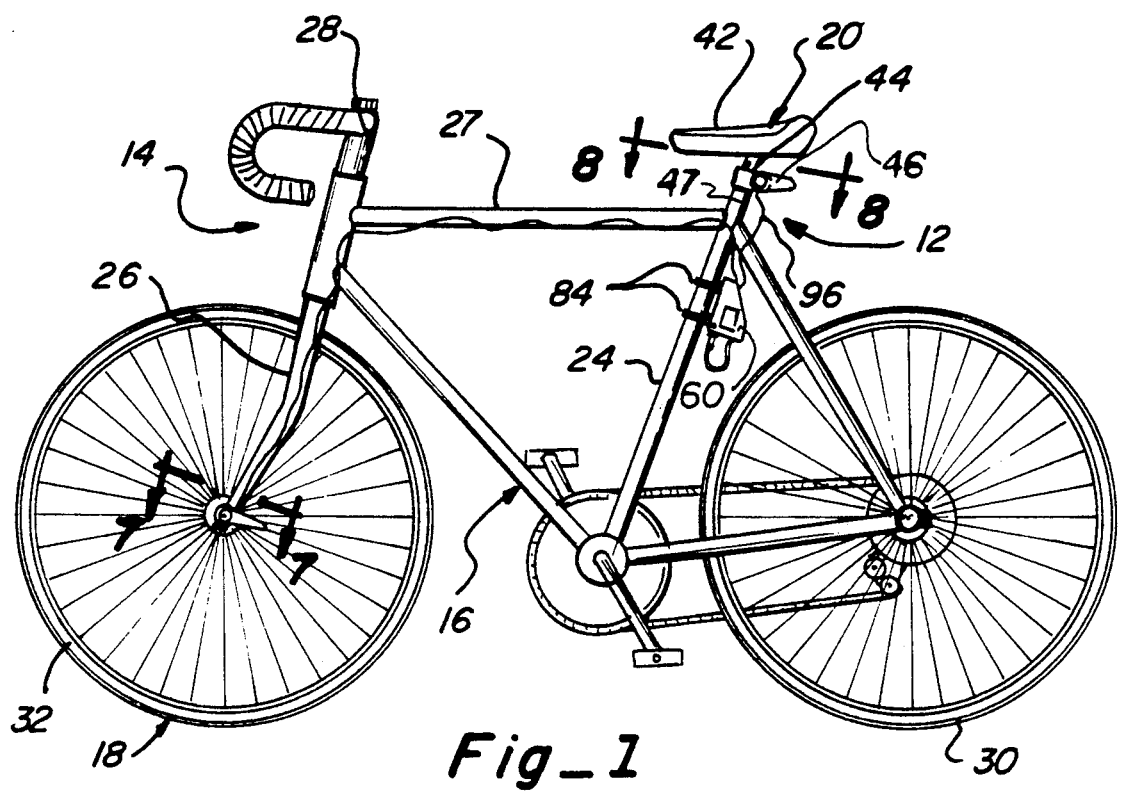
Fig_1
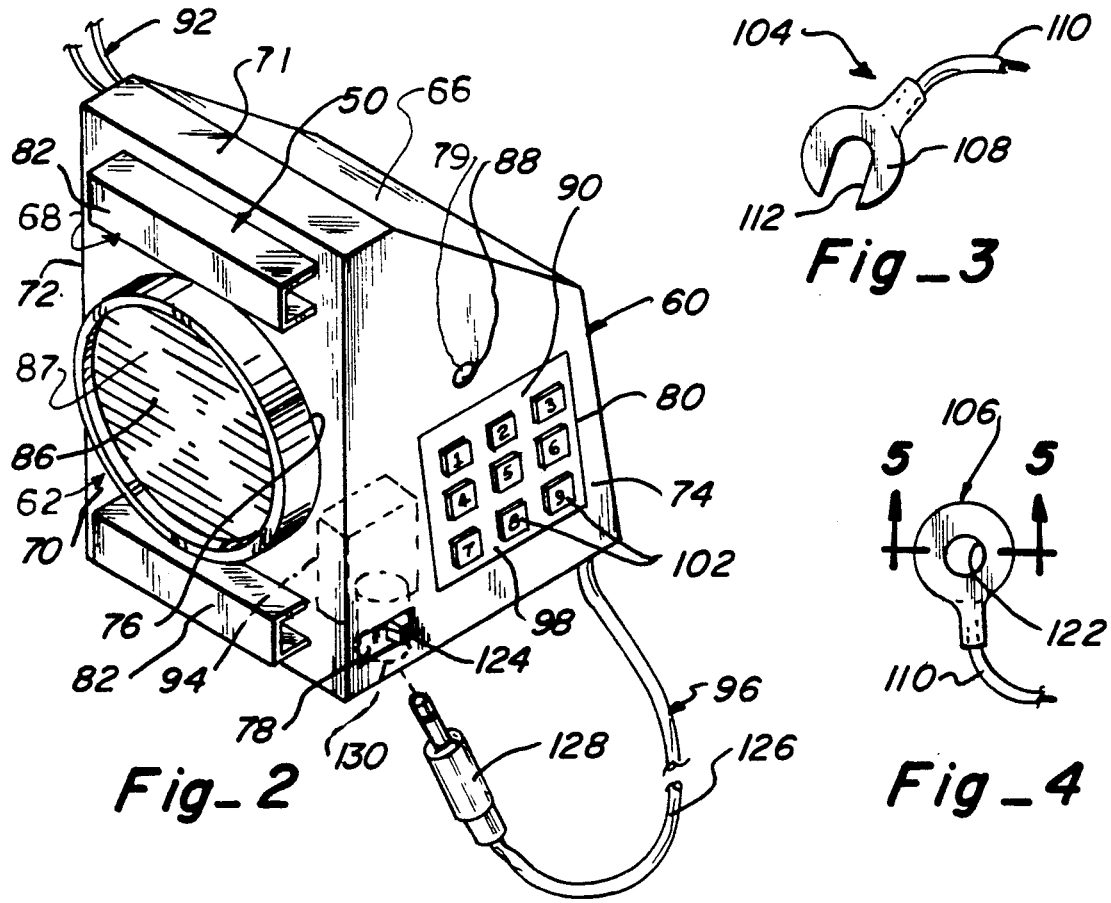
Fig_2
Fig_3
Fig_4

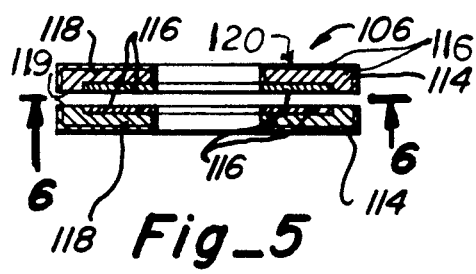
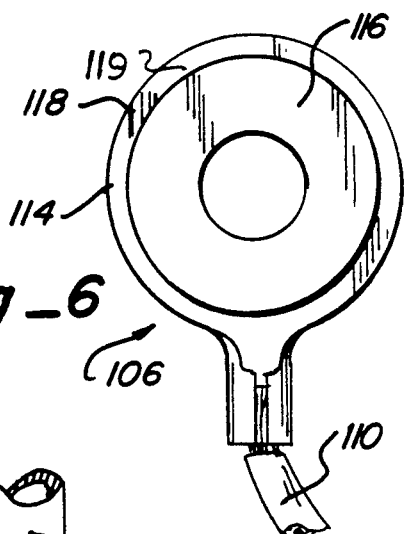
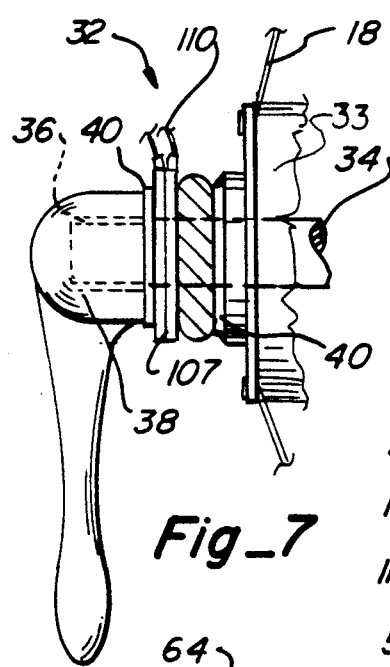
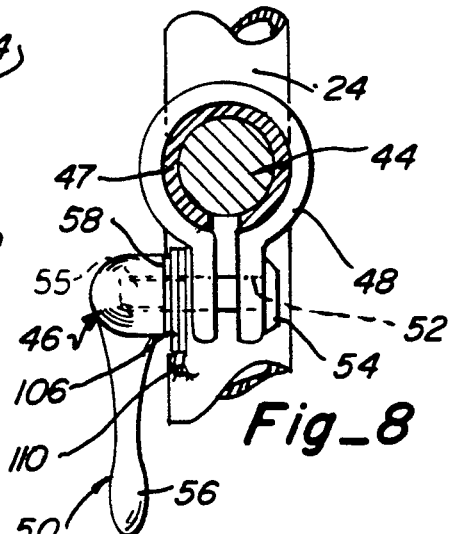
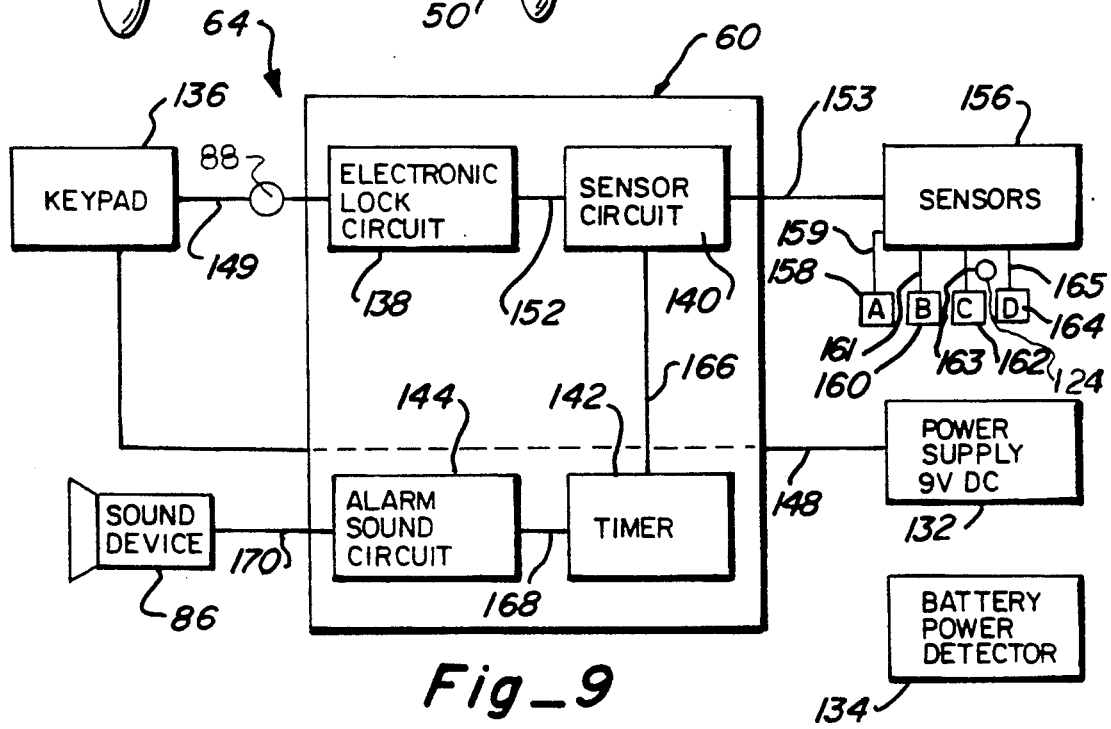

BICYCLE AND BICYCLE ELEMENTS THEFT ALARM APPARATUS

The invention has been described in a Disclosure Document No. 262677, entitled "Comprehensive Electronic Bicycle Theft Alarm System", filed on Sep. 14, 1990 in the United States Patent Office.

PRIOR ART

A patent search on this invention revealed the following United States Patents:

| U.S. Pat. No. | Invention | Inventor |
| --- | --- | --- |
| 3,824,540 | BICYCLE LOCK AND ALARM APPARATUS | Kobert R. Smith II |
| 3,828,310 | BICYCLE THEFT ALARM | Albert J. Miller |
| 4,663,611 | ALARM LOCK | Chris W. Humphrey |
| 4,776,188 | LOCKING AND ALARM COMBINATION SECURITY DEVICE | Dalaba et al |
| 4,920,334 | SECURITY SYSTEM FOR BICYCLES, SKI RACKS AND COAT RACKS | Dean R. DeVolpt |

The Smith, II patent discloses a bicycle lock and alarm apparatus utilizing a continuous electrical conductor type cable which, when it is cut or removed from its receiving receptacle, activates an alarm device.

The Miller patent discloses a bicycle theft alarm which is a motion detector type having a pendulum switch to sense movement which activates an alarm device.

The Humphrey patent discloses an alarm lock having an electrical conductor cable whereupon tampering therewith would cause an alarm device to operate for a fixed period of time.

The Dalaba et al patent discloses a locking and alarm combination security device having an electrically conductive cable and an optical conduction path which sets off an alarm device.

The DeVolpt patent discloses a security system for bicycles, ski racks, and the like having an electrically conductive cable which sets off an alarm when it is severed. This patent also discloses the use of a keyboard in order to activate a combination to activate and deactive the alarm system which is connected to an alarm device.

PREFERRED EMBODIMENT OF THE INVENTION

In one preferred embodiment of this invention, a bicycle theft alarm apparatus is attached to a bicycle assembly and elements there in order to protect the unauthorized removal of a bicycle wheel member, a bicycle seat member, and from connection to a stationary anchor member and unauthorized movement of the bicycle assembly.

The bicycle theft alarm apparatus includes 1) a housing assembly which is secured to a portion of a support frame assembly of the bicycle assembly; 2) an alarm assembly or means mounted within the housing assembly; and 3) a control circuit assembly interconnected to the alarm assembly and mounted within the housing assembly.

The housing assembly includes a box-like housing member which is secured by a support bracket assembly through clamp members to the support frame assembly of the bicycle assembly.

The alarm assembly includes 1) an audio and/or visual alarm member; 2) a power indicator light which indicates that electrical power is being supplied to the system; 3) an actuator key pad assembly having key members which are used to activate the system through a confidential key code; 4) a quick release sensor assembly having a wheel release actuator member connected to a front wheel member of the bicycle assembly and a seat release actuator member connected to a support seat assembly; 5) a motion detector assembly to indicate unauthorized movement of the bicycle assembly; and 6) a cable motion detector assembly having an electrical cable member which, when removed from a plug member or severed, will activate the alarm member.

The actuator key pad assembly includes a support plate having key members individually identified by numbers one to nine (1-9) which are selectively activated to provide an activation and deactivation code to control operation of the alarm system.

The wheel release actuator member includes an actuator clamp member which is mounted between washer members on the front wheel member of the bicycle assembly so, when a lock lever member is loosened, it will cause the actuator clamp member to break an electrical circuit to energize the alarm member when in an alarm system mode.

The seat release actuator member includes an actuator clamp member which is operably connected to a clamp member used to hold the seat support assembly on the bicycle assembly and, when the clamp member is loosened, the actuator clamp member will break an electrical circuit to actuate the alarm member when in the alarm system mode.

The control circuit assembly includes 1) a power supply circuit to provide electrical power to the entire system; 2) an actuator key pad circuit to provide energization or de-energization to the alarm assembly; 3) a main sensor circuit interconnected to the motion detector assembly, the cable motion detector assembly, the wheel release actuator member, and the seat release actuator member to cause the alarm member to be activated on tampering therewith; 4) a lapse timer circuit in order to adjustably limit the time the alarm member is actuated after tampering with the main sensor circuit; and 5) an alarm sound circuit to provide actuation of the alarm member.

It is noted that the bicycle theft alarm apparatus is operable to 1) protect the front wheel member on the bicycle assembly; 2) protect the support seat assembly on the bicycle assembly; 3) detect motion of the bicycle member; and 4) detect whether a cable member, which has been placed about an immovable object to prevent unauthorized movement of the bicycle assembly, has been violated by unplugging or severing thereof.

OBJECTS OF THE INVENTION

One object of this invention is to provide a bicycle theft alarm apparatus which can be 1) secured to a main frame member on any bicycle assembly; 2) connected to a bicycle seat member to energize an alarm on its unauthorized attempted removal; 3) connected to a bicycle front wheel member so as to energize the alarm on its unauthorized attempted removal; 4) connected through an electrically conductive cable member about an immovable object to indicate its removal therefrom to energize the alarm; and 5) connected to a motion detector assembly operable on unauthorized movement of the bicycle assembly to energize the alarm.

Another object of this invention is to provide a bicycle theft alarm apparatus having an alarm assembly which is transferred from an deactivated to activated condition, and visa versa, through the use of a actuator key pad assembly with a confidential number code not requiring the use of a key member or the like.

One other object of this invention is to provide a bicycle theft alarm apparatus which can be readily secured to an object to be protected which sets off an audio and/or visual alarm member due to 1) unauthorized movement of the object; 2) movement of one or more detachable portions of the object; and 3) severing or disconnecting of a cable member attached to the protected object.

One further object of this invention is to provide a bicycle theft alarm apparatus which is secured to a support frame assembly on a bicycle assembly to set off an alarm member on unauthorized movement, tampering, or theft of individual elements of the bicycle assembly.

Still, another object of this invention is to provide a bicycle theft alarm apparatus that is easily attached to a structure, such as a bicycle assembly, to be protected; economical to manufacture; usable with a secret code number series on an actuator key pad assembly; operable to set off an alarm member on various unauthorized tampering and/or movement of the bicycle assembly; easy to use; and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a side elevational view of a bicycle assembly having a bicycle theft alarm apparatus of this invention mounted thereon;

FIG. 2 is a perspective view of a housing assembly of the bicycle theft alarm apparatus of this invention;

FIG. 3 is a fragmentary side elevational view of a wheel release actuator member of an alarm assembly of this invention;

FIG. 4 is a fragmentary top plan view of a seat release actuator member of the alarm assembly of this invention;

FIG. 5 is an enlarged sectional view taken along line 5—5 in FIG. 4;

FIG. 6 is a sectional view taken along line 6—6 in FIG. 5;

FIG. 7 is an enlarged fragmentary sectional view taken along line 7—7 in FIG. 1;

FIG. 8 is an enlarged fragmentary sectional view taken along line 8—8 in FIG. 1; and FIG. 9 is an electrical schematic of a control circuit assembly of the bicycle theft alarm apparatus of this invention.

The following is a discussion and description of preferred specific embodiments of the bicycle theft alarm apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail and, in particular to FIG. 1, a bicycle and bicycle elements theft alarm apparatus of this invention, indicated generally at 12, is illustrated as attached to a bicycle assembly 14 to prevent the unauthorized theft and tampering therewith. It is to be noted that the bicycle theft alarm apparatus 12 could be mounted on other objects for the same purpose and function such as a motorcycle, a newspaper dispensing machine, a pop or candy machine, or other similar devices.

The bicycle assembly 14 is of a conventional nature having 1) a support frame assembly 16; 2) a support wheel assembly 18 secured to the support frame assembly 16; and 3) a support seat assembly 20 mounted on the support frame assembly 16.

The support frame assembly 16 includes a vertical support strut 24 interconnected by a horizontal support member 27 to a front wheel support yolk 26 which, in turn, is connected to handlebars 28.

The support wheel assembly 18 include a rear wheel member 30 and a front wheel member 32. This invention is primarily concerned with unauthorized removal of the front wheel member 32 as it is normally removed for replacement due to wear and maintenance, use on different terrain, or for transportation purposes by a bicycle operator. Therefore, the front wheel member 32 is manufactured so as to be easily removed from the front wheel support yolk 26 and this is an area of theft prevention to be protected by the bicycle theft alarm apparatus 12 of this invention.

As noted in FIG. 7, the front wheel member 32 includes a wheel hub 33 mounted rotatably about a central wheel axle 34 having a threaded end section 36. A lock lever member 38 mounted on the threaded end section 36 forces a washer member 40 against a portion of the bicycle theft alarm apparatus 12 which will be described in detail.

As noted in FIG. 1, the support seat assembly 20 has a seat member 42 connected to a seat support shaft 44 which, in turn, is connected by a lock clamp assembly 46 for securing to an upper portion 47 of the vertical support strut 24.

As shown in FIG. 8, the seat support shaft 44 is releasably connected to the support strut 24 by the lock clamp assembly 46 which includes a clamp member 48 mounted about the seat support shaft 44 and the upper portion 47 of the support strut 24. The clamp member 48 has aligned clamp holes 52 to receive a lock lever assembly 50 therein.

More particularly, the lock lever assembly 50 includes a bolt member 54 having a head portion mounted against one outer side of the clamp member 48 and a threaded portion 55 having a seat lock lever 56 mounted thereon. The seat lock lever 56 operates to clamp a washer member 58 against an element of the bicycle theft alarm apparatus 12 as will be explained.

The bicycle theft alarm apparatus or means 12 includes 1) a main housing assembly 60; 2) an alarm assembly or means 62 operably connected and mounted within the main housing assembly 60; and 3) a control circuit assembly 64 (FIG. 9) which controls and permits alarm operation of the bicycle theft alarm apparatus 12.

The main housing assembly 60 includes a housing member 66 having a support bracket assembly 68 secured thereto which is attachable to a portion of the support frame assembly 16 of the bicycle assembly 14 as will be noted.

The housing member 66 includes a front wall 70, a top wall 71, and parallel side walls 72, 74. The front wall 70 is provided with an opening 76 to contain a visual and/or alarm member therein. The side wall 74 is provided with a switch opening 78, a light opening 79, and a key pad opening 80.

The support bracket assembly 68 is provided with a pair of spaced bracket members 82 of U-shape in transverse cross section which are secured by clamp members 84 to the vertical support strut 24 of the support frame assembly 16 of the bicycle assembly 14 as noted in FIG. 1.

The alarm assembly 62 includes 1) an alarm member 86 which is of a conventional high pitched piezo alarm or buzzer and may include a flashing light member 87; 2) a power indicator light 88 mounted within the light opening 79 which indicates that the power is "on" in the system which is now in the alarm mode condition; 3) an actuator key pad assembly 90 mounted within the key pad opening 80 in the side wall 74; 4) a quick release sensor assembly 92 which has electrical wire members extending from the side wall 72; 5) a motion detector assembly 94 mounted within the housing member 66; and 6) a cable motion detector assembly 96 securely connected at one end to the housing member 66 and releasably connected to another portion of the housing member 66 for reasons to be explained.

The alarm member 86 is the high pitched piezo alarm member and may include the flashing light member 87 to provide night time visual indication of a tampering of the bicycle assembly 14.

The actuator key pad assembly 90 includes a support plate 98 having a plurality of spaced key members 102 with respective numerals 1-9 thereon. The key members 102 can be sequentially depressed to a secret code in order to activate and deactivate the control circuit assembly 64 and the entire alarm system.

The quick release sensor assembly 92 includes a wheel release actuator member 104 and a seat release actuator member 106.

As noted in FIG. 3, the wheel release actuator member 104 includes an actuator clamp member 108 of U-shape having a bolt entrance slot 112 and connected to a conductive wire member 110.

The actuator clamp member 108 is constructed of actuator half sections 114, each having an insulation layer 116 and an electrical conductor section 118.

As noted in FIG. 5, the insulation layer 116 extends about the electrical conductor section 118 with a circular peripheral conductor portion 119 to provide a sole area of electrical contact.

The electrical conductor section 118 is connected through the conductive wire member 110 to the control circuit assembly 64.

As noted collectively in FIGS. 4, 5, and 6, the seat release actuator member 106 is provided with an actuator clamp member 120 of circular washer shape having a bolt receiver opening 122 and actuator half sections 114.

The actuator half sections 114 have been previously described having an insulation layer 116 and a conductor section 118 which, in turn, is connected through the conductor wire member 110 to the control circuit assembly 64.

The motion detector assembly 94 is a conventional structure having a motion detector switch member 124 mounted in the switch opening 78. This can be a vibratory or pendulum structure which, on motion of the bicycle assembly 14 and the main housing assembly 60, operates to disconnect an electrical circuit which will set off the alarm member 86. The switch member 124 is placed in an electrically connected position to remove the motion detector assembly 94 from the alarm assembly 62 for reasons to be explained.

As noted in FIG. 2, the cable motion detector assembly or cable disconnect and severance assembly 96 includes an electrical cable member 126 preferably mounted on a retractable reel member with a plug member 128 mounted on an outer end thereof.

The plug member 128 is operable to be placed within an electrically conductive receptacle member 130 which completes an electrical circuit therethrough. On severance of the electrical cable member 126 or detachment of the plug member 128 from the receptacle member 130, this activates the alarm member 86 when the system is in the alarm mode.

The control circuit assembly 64 includes 1) a power supply circuit 132 which is illustrated as a 9 volt D.C. battery power supply; 2) a battery power detector 134 to indicate power available from the power supply circuit 132; 3) an actuator key pad circuit 136 to energize the entire alarm system from active to inactive and visa versa conditions; 4) a key pad lock circuit 138 connected to the actuator key pad assembly 90; 5) a main sensor circuit 140 operably connected to the numerous sensors described herein to energize the alarm member 86; 6) a lapse timer circuit 142 to disconnect the alarm member 86 after a predetermined time period and reset itself in the alarm system mode; and 7) an alarm sound circuit 144 connected to the alarm member 86.

More particularly, the power supply circuit 132 is connected by a line member 148 to the actuator key pad circuit 136 to control energization of the alarm assembly or means 62. The battery power detector 134 is built into the alarm member 86 and operable to emit an audio chirp to indicate a low battery power supply condition requiring replacement of the battery power supply.

The actuator key pad circuit 136 is connected by a line member 149 to the key pad lock circuit 138 which, in turn, is connected by a line member 152 to the main sensor circuit 140. In turn, the main sensor circuit 140 is connected to the sensor assembly 156 connected by a line member 153 to the main sensor circuit 140.

The sensor assembly 156 includes 1) a wheel sensor circuit 158 connected by a line member 159 to the sensor assembly 156; 2) a seat sensor circuit 160 connected by a line member 161 to the sensor assembly 156; 3) a motion sensor circuit 162 connected by a line member 163 to the sensor assembly 156; and 4) a cable motion sensor circuit 164 connected by a line member 165 to the sensor assembly 156. The switch member 124 is mounted in line 163 and operable in a closed condition to bypass the motion detector assembly 94.

On actuation of any one of the sensor circuits 158, 160, 162, 164, the condition thereof is sent through the line member 153 to the main sensor circuit 140 which, in turn, is transferred through a line member 166 to the lapse timer circuit 142. The lapse timer circuit 142 is of a conventional nature and may be adjustable from one to fifteen minutes or the like and operable to return the entire alarm system to a deactivated condition after a preset time period.

The lapse timer circuit 142 is connected by a line member 168 to the alarm sound circuit 144 which, in turn, is connected by a line member 170 to the alarm member 86 for actuation thereof.

USE AND OPERATION OF THE INVENTION

In the use and operation of this invention, the bicycle and bicycle elements theft alarm apparatus or means 12 is secured to the bicycle assembly 14 and, more specifically, the main housing assembly 60 through the support bracket assembly 68 by the clamp members 84 to the vertical support strut 24 in a manner so that it cannot be removed therefrom. One method would be to have a connector portion of the clamp members 84 mounted within the enclosure of the housing member 66 so it would be tamper proof.

In order to prevent unauthorized removal of the front wheel member or assembly 32 mounted as noted in FIG. 7, the wheel release actuator member 104 is mounted about the threaded bolt member 36 and clamped between an outer washer member 40 and the lock lever member 38. The lock lever member 38 is rotated to provide a clamping action and electrical conduction between the conductor sections 118 of the actuator half sections 114.

It is noted that a loosening of the lock lever member 38 achieves expansion of the insulation layers 116 to achieve a non-electrically conductive condition by separation of the conductor portions 119 to achieve actuation of the alarm member 86.

As shown in FIG. 8, the seat release actuator member 106 is mounted on the threaded end portion 55 of the bolt member 54 and clamped against an outer surface of the clamp member 48. The washer member 58 is mounted between the seat release actuator member 106 and an inner surface of the seat lock lever 56.

The seat release actuator member 106 operates on clamping action to complete a circuit between the conductor section 118 through the conductive wire member 110 to the seat sensor circuit 160, line members 161, 153, and the main sensor circuit 140.

On loosening of the seat lock lever 56, the electrical circuit through the conductor portions 119 is broken to cause energization of the alarm member 86 when in the alarm system mode.

With the front wheel member 32 and the seat member 42 now interconnected to the respective wheel release actuator member 104 and the seat release actuator member 106, the bicycle theft alarm apparatus 12 is now in condition for use by the bicycle operator.

When the bicycle operator reaches a destination for leaving the bicycle assembly 14, the support frame assembly 16 is to be secured to an immovable object such as a steel post, bicycle rack, or the like. The cable member 126 is trained about the immovable object and the plug member 128 is mounted within the receptacle member 132.

The bicycle operator may then close the motion detector switch member 124 to activate the motion detector assembly 94. Conversely, the switch member 124 can be opened to remove the motion detector assembly 94 from the alarm mode condition.

The bicycle operator then activates the alarm assembly 62 by inserting a secret code through the key members 102 in the actuator key pad or confidential code assembly 90. For instance, a three, four, or six digit secret code can be used, such as 4, 7, 9, and 8, which will then energize through the actuator key pad circuit 136, line member 149, the key pad lock circuit 138, and the main sensor circuit 140.

At this time, the main sensor circuit 140, through line member 153, energizes the sensor assembly 156. This energizes the alarm system mode through the wheel release actuator member 104, the seat release actuator member 106, the motion detector assembly 94, and the cable motion detector assembly 96.

The system is indicated in an "alarm set" condition by the now illuminated power indicator light 88.

In this condition, the bicycle theft alarm apparatus 12 is sensitive to unauthorized movement of the bicycle assembly 14 in lateral and/or vertical directions as this will trip the motion detector assembly 94 to energize the alarm member 86. This motion detecting alarm status will continue for a predetermined and adjustable time period by the lapse timer circuit 142 connected through the alarm sound circuit 144 to energize the alarm member 86. After a preset adjusted time period, this circuit will be de-energized and return to its normal alarm system mode.

When in the alarm system mode sensitive condition, it is noted that movement of the lock lever member 38 connected to the front wheel member 32 will open the circuit within the wheel release actuator member 104 to energize the alarm member 86 through the lapse timer circuit 142.

Similarly, movement of the seat lock lever 56 in an attempt to remove the seat member 42 and interconnected seat support shaft 44 will actuate the seat release actuator member 106 through the seat sensor circuit 160 to energize the alarm member 86. Again, the alarm member 86 may cease to sound after a certain time period if the seat lock lever 56 or the wheel lock lever member 38 is returned to the respective clamped conditions. However, the alarm member 86 will continue to sound for a preset time period until it is reset through the lapse timer circuit 142.

Additionally, it is noted that a cutting or severing of the electrical cable member 126 or detachment of the plug member 128 from the receptacle member 160 will cause a ceasing of electrical flow therethrough and will actuate the alarm member 86.

When the bicycle operator returns to the secured bicycle assembly 14, the bicycle theft alarm apparatus 12 can be de-energized by inserting a secret code through the key members 102 on the actuator key pad assembly 90. As this will then de-energize the entire alarm system mode circuitry, the bicycle assembly 14 can be detached by the electrical cable member 126 from the immovable object and the bicycle operator is free to proceed without actuating the alarm member 86.

The bicycle theft alarm apparatus 12 has been described with the alarm means 12 using the quick release sensor assembly 92 to indicate unauthorized movement of the front wheel assembly 32 and/or the support seat assembly 20. It is noted that other means could be used to indicate and signal unauthorized movement of subject bicycle parts and other parts such as infrared detectors, photoelectric cells, laser beam sensors, fiber-optic sensors, and the like.

It is noted that the bicycle theft alarm apparatus is economical to manufacture; simple to operate; substantially maintenance free; and provided with numerous types of sensors to indicate movement of the bicycle assembly, removal of parts thereof such as the support seat assembly and a front wheel assembly, and disconnected from an anchor object.

While the invention has been described in conjunction with preferred specific embodiments thereof, it will be understood this description is intended to illustrate and not to limit the scope of the invention, which is defined by the following claims:

I claim:

1. A theft alarm apparatus mounted on an object and operable to sound an alarm on unauthorized tampering of the object, comprising:
   a) a control housing assembly having an alarm means mounted thereon;
   b) said alarm means includes a quick release sensor assembly operably connected to removable sections of the object being protected and to an alarm member;
   c) said quick release sensor assembly includes a wheel release actuator member connected to a wheel assembly on the object being protected;
   d) said quick release sensor assembly further includes a seat release actuator assembly connected to a support seat assembly on the object being protected;
   e) said wheel release actuator member and said seat release actuator member having actuator half sections to complete an electrical circuit therethrough when in a clamped condition; and
   f) when said wheel assembly or said support seat assembly are attempted to be removed from the object being protected, said actuator half sections move to a non-contact electrical condition in order to disconnect the electrical circuit through said actuator half sections operable to energize said alarm member to present at least one of a visual and audio alarm signals therefrom to indicate unauthorized activity taking place on the object being protected.

2. A theft alarm apparatus mounted on a bicycle assembly having a front wheel assembly connected to a front wheel support yoke and a support seat assembly connected to a support frame assembly and operable to activate an alarm on unauthorized tampering of the bicycle assembly, comprising:
   a) a main housing assembly connected to said bicycle assembly to prevent unauthorized removal thereof;
   b) an alarm means mounted on said main housing assembly and connected to the front wheel assembly and the support seat assembly of the bicycle assembly;
   c) said alarm means connected to an alarm member and a control circuit assembly; and
   d) said alarm member energized to activate at least one of a visual and audio alarms on attempted removal of the front wheel assembly or the support seat assembly from the bicycle assembly.

3. The theft alarm apparatus as described in claim 2, wherein:
   a) said alarm means includes a quick release sensor assembly having a wheel release actuator member connected to the front wheel assembly and a seat release actuator member connected to the support seat assembly;
   b) said wheel release actuator member said seat actuator member each said having actuator half sections which, when clamped together, completes an electric circuit therethrough and, when separated, breaks said electrical circuit which then energizes said alarm member.

4. The theft alarm apparatus as described in claim 2, wherein:

a) said control circuit assembly includes a power supply circuit connected to a confidential code assembly which, in turn, is connected to said alarm means after a confidential secret code has been imposed on said confidential code assembly, to then allow the electrical power supply from said power supply circuit to flow to remaining portions of said alarm means and said control circuit assembly; and
   b) said alarm means includes a motion detector assembly connected to said alarm member and operable to energize same on any movement of the bicycle assembly when said theft alarm apparatus is in an energized alarm condition.

5. The theft alarm apparatus as described in claim 2, wherein:
   a) said control circuit assembly includes a power supply circuit connected to a confidential code assembly which, in turn, is connected to said alarm means after a confidential secret code has been imposed on said confidential code assembly, to then allow the electrical power supply from said power supply circuit to flow to remaining portions of said alarm means and said control circuit assembly; and
   b) said alarm means includes a cable disconnect and severance detector assembly having a cable member connected through a receptacle member to said main housing assembly and operable to be placed about an immovable anchored object and reconnected to said alarm means to complete a circuit therethrough;
   whereby movement of said cable member so as to be disconnected from said receptacle member or severance thereof operates to energize said alarm member to indicate unauthorized tampering of the bicycle assembly when in an alarm energized condition.

6. The theft alarm apparatus as described in claim 2, wherein:
   a) said control circuit assembly includes a power supply circuit to supply power to an actuator key pad circuit which is operable to receive a secret code in order to place said theft alarm apparatus in an energized alarm system mode condition and a main sensor circuit; and
   b) said main sensor circuit having a wheel sensor circuit, a seat sensor circuit, a motion sensor circuit, a cable motion sensor circuit, operably connected to said alarm member to energize same on tampering with the bicycle assembly.

7. The theft alarm apparatus as described in claim 2, wherein:
   a) said control circuit assembly includes a power supply circuit connected to a confidential code assembly which, in turn, is connected to said alarm means after a confidential secret code has been imposed on said confidential code assembly, to then allow the electrical power supply from said power supply circuit to flow to remaining portions of said alarm mean and said control circuit assembly; and
   b) said control circuit assembly includes a lapse timer circuit mounted between said main sensor circuit and said alarm member operable in response to a predetermined adjustable time period to de-energize said alarm member after at least one of unauthorized movement and tampering of the bicycle assembly is discontinued and said theft alarm apparatus is returned to its energized alarm system mode condition.

8. A theft alarm apparatus mounted on a bicycle assembly including bicycle elements to be protected against theft having a front wheel assembly connected to a front wheel support yoke and a support seat assembly connected to a support frame assembly and operable to activate an alarm on unauthorized tampering of the bicycle elements on the bicycle assembly, comprising:
   a) a main housing assembly connected to said bicycle assembly;
   b) an alarm means mounted on said main housing assembly and connected to at least one of the bicycle elements of the bicycle assembly;
   c) said alarm means connected to an alarm member and a control circuit assembly;
   d) said alarm member energized to sound an alarm on attempted removal of at least one of said bicycle elements from the bicycle assembly;
   e) said alarm means includes a quick release sensor assembly having a wheel release actuator member connected to the front wheel assembly; and
   f) said wheel release actuator member having actuator sections which, when clamped together, completes an electrical circuit therethrough and, when separated, breaks said electrical circuit which then energizes said alarm member.

9. A theft alarm apparatus mounted on a bicycle assembly including bicycle elements to be protected against theft having a front wheel assembly connected to a front wheel support yoke and a support seat assembly connected to a support frame assembly and operable to activate an alarm on unauthorized tampering of the bicycle elements on the bicycle assembly, comprising:
   a) a main housing assembly connected to said bicycle assembly;
   b) an alarm means mounted on said main housing assembly and connected to at least one of the bicycle elements of the bicycle assembly;
   c) said alarm means connected to an alarm member and a control circuit assembly;
   d) said alarm member energized to sound an alarm on attempted removal of at least one of said bicycle elements from the bicycle assembly;
   e) said alarm means includes a quick release sensor assembly having a seat release actuator member connected to the support seat assembly; and
   f) said seat actuator member having actuator sections which, when clamped together, completes an electrical circuit therethrough and, when separated, breaks said electrical circuit which then energizes said alarm member.

10. A theft alarm apparatus mounted on a bicycle assembly including bicycle elements to be protected against theft having a front wheel assembly connected to a front wheel support yoke and a support seat assembly connected to a support frame assembly and operable to activate an alarm on unauthorized tampering of the bicycle elements on the bicycle assembly, comprising:
   a) a main housing assembly connected to said bicycle assembly;
   b) an alarm means mounted on said main housing assembly and connected to at least one of the bicycle elements of the bicycle assembly;
   c) said alarm means connected to an alarm member and a control circuit assembly;
   d) said alarm member energized to sound an alarm on attempted removal of at least one of said bicycle elements from the bicycle assembly; and
   e) said alarm means includes a motion detector assembly connected to said alarm member and operable to energize same on any movement of the bicycle assembly when said theft alarm apparatus is in an energized alarm condition.

11. A theft alarm apparatus mounted on a bicycle assembly including bicycle elements to be protected against theft having a front wheel assembly connected to a front wheel support yoke and a support seat assembly connected to a support frame assembly and operable to activate an alarm on unauthorized tampering of the bicycle elements on the bicycle assembly, comprising:
   a) a main housing assembly connected to said bicycle assembly;
   b) an alarm means mounted on said main housing assembly and connected to at least one of the bicycle elements of the bicycle assembly;
   c) said alarm means connected to an alarm member and a control circuit assembly;
   d) said alarm member energized to sound an alarm on attempted removal of at least one of said bicycle elements from the bicycle assembly; and
   e) said alarm means includes a cable disconnect and severance detector assembly having a cable member connected through a receptacle member to said main housing assembly and operable to be placed about an immovable anchored object and reconnected to said alarm means to complete a circuit therethrough;
   whereby movement of said cable member so as to be disconnected from said receptacle member or severance thereof operates to energize said alarm member to indicate unauthorized tampering of the bicycle assembly when in an alarm energized condition.

* * * * *